March 11, 1924.
C. W. R. CAMPBELL ET AL
OPTICAL SYSTEM
Filed Nov. 30, 1915.
1,486,362
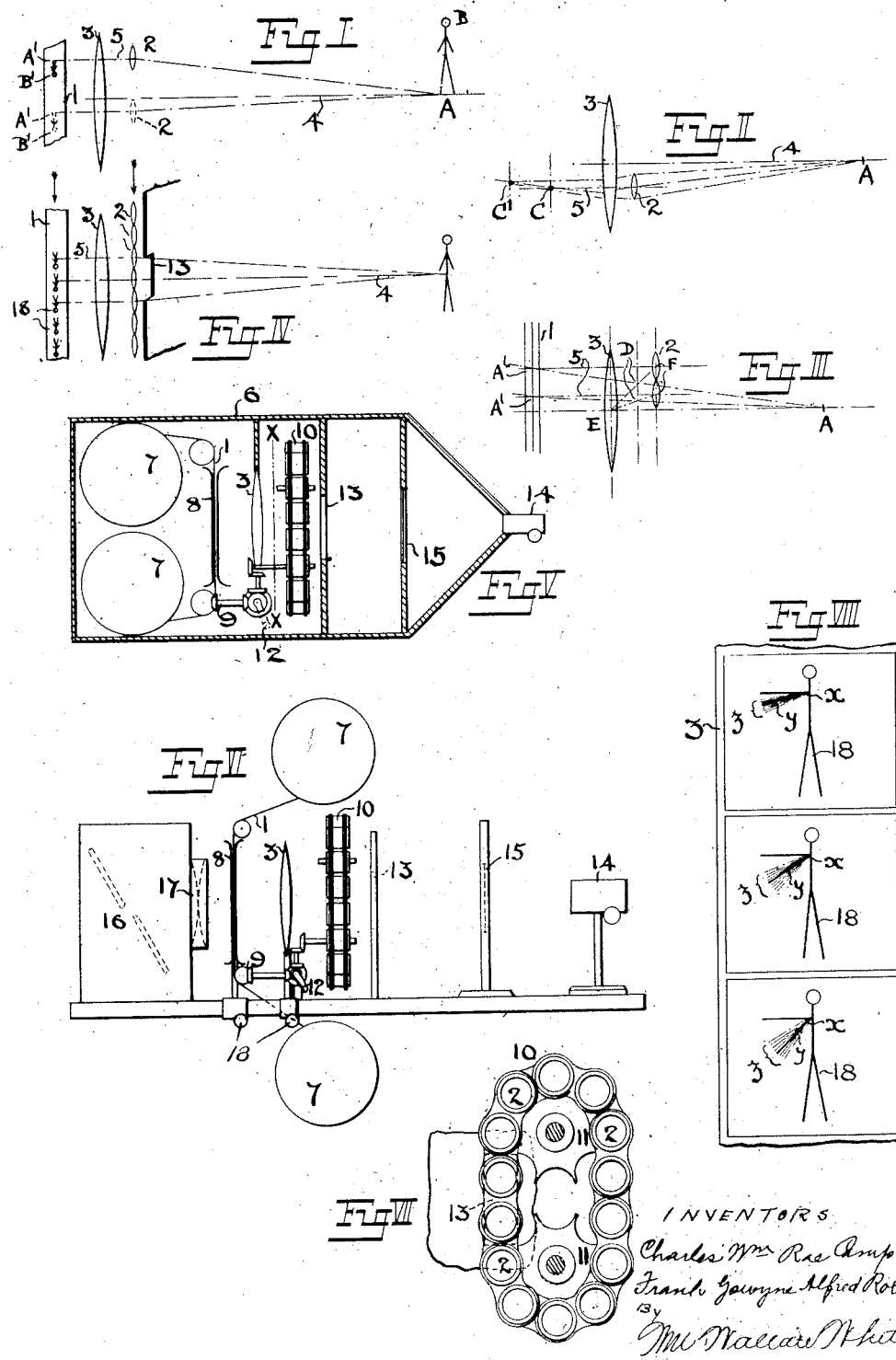

Patented Mar. 11, 1924.

1,486,362

UNITED STATES PATENT OFFICE.

CHARLES W. R. CAMPBELL, OF GERMISTON, TRANSVAAL, AND FRANK G. A. ROBERTS, OF PARKTOWN, JOHANNESBURG, TRANSVAAL, SOUTH AFRICA.

OPTICAL SYSTEM.

Application filed November 30, 1915. Serial No. 64,327.

*To all whom it may concern:*

Be it known that CHARLES WILLIAM REA CAMPBELL, resident of Driehock, Germiston, Transvaal, South Africa, and FRANK GOWYNE ALFRED ROBERTS, resident of corner of Victoria and St. Patrick's Avenues, Parktown, Johannesburg, Transvaal, South Africa, both British subjects, have invented certain new and useful Improvements in Optical Systems, of which the following is a specification.

The purpose of the present invention is to provide an optical system suitable for the production, and projection for exhibition, of groups of similar pictures, especially consecutive pictures for kinematograph purposes. A further purpose is the production of a kinematograph record which gives more life-like motion effects than those hitherto used.

In the accompanying drawings,

Figs. I to IV are diagrams illustrating the system.

Figs. V and VI show the invention embodied in a camera and projector respectively.

Fig. VII is a detail section on the plane X—X Fig. V.

Fig. VIII shows a portion of a kinematograph film.

Referring more particularly to Fig. I, AB indicates any object to be photographed and 1 a picture support (herein called a film). 2 is a small lens and 3 a larger lens between the lens 2 and the film. Said lenses 2 and 3 are in planes parallel with the film; they are shown as simple lenses but may be optical systems. The side of the combination 2 3 on which the object AB lies is, for convenience of reference, considered as the front.

The lenses 2 3 form an optical combination the parts of which may be adjusted relatively to one another and to the film and the object to produce different conjugate foci. They are for the purpose of this invention so adjusted that the conjugate foci A A' are respectively on the principal axis 4 of the large lens 3 in front of the system and on the principal axis 5 of the small lens 2 at the plane of the film.

With the parts so positioned the lens 2 produces on the film an image A' B' of the object AB, which image is identical for all positions of the lens 2 in its plane and which is always directly behind, or in the same relative position to, said lens. For instance. if the lens 2 in Fig. I be moved in its plane to the position indicated by the dotted lines 2 the dotted image A' B' then produced by it is identical with the full line image A' B' and has not moved its position relatively to the lens 2. Conversely, whatever the position of lens 2 in its plane, any object A' at the rear focus will always be imaged at A.

The condition stated does not require the object to be accurately focussed for definition. Fig. II shows the lenses moved relatively so that the centre of the bundle of rays from A intersects the axis 5 at C, and if the film be placed in the plane of C, the image produced on it is the same and in the same position relatively to the lens 2 whatever the position of said lens in its plane. On the other hand if the film is placed in the plane of C'—where the definition is correct—imperfect results follow. In referring to identical images, the effect of parallax due to variation of the point of view of the lens 2 is disregarded since it is usually minute.

These features may be further explained by reference to Fig. III. The optical centre D of the system 3 2 lies on the line EF joining the optical centres E and F respectively of the separate lenses 2 and 3, and divides that line in a constant ratio dependent on the respective focal lengths of said lenses. The locus of said centre D is therefore a plane D D parallel with the plane F F of movement of the lens 2 and the plane of the film. Consequently the locus of the focal point A', conjugate to A, is a plane,—that of the film. It follows also that the rate of movement of the optical centre D resulting from the movement of lens 2, is differentiated with regard to the movement of lens 2 and said differentiation causes the movement of the focal point A' in the plane of the film to be equal to and uniform with the movement of the point F in its plane, i. e., with the movement of the lens 2.

The required condition of adjustment may be attained practically by positioning two lenses 2 in the same plane, e. g., the full and dotted line lenses 2, Fig. I, and making such adjustments that the separate images A′ B′ so produced are of the same pitch as the lenses 2; i. e., so that the distance between the same point, such as A′, A′, in the two images is equal to the separation of the centres of the lenses 2. It follows from what has been said that if the lens 2 and the film are moved together, the image as a whole will remain stationary on the film when photographing an object; or vice versa, an image of a picture on the film will remain stationary when projected onto a screen placed at A B.

A suitable arrangement for this purpose is outlined in Fig. IV.

1 indicates a film moving continuously in the direction of the arrow. 3 is the fixed lens. It is preferred to employ a series of lenses 2 moving in succession and uniformly with the film, as indicated. The figure shows the necessary elements of either a camera for taking a succession of photographs on the film, or a projector for throwing the image of such pictures onto a screen. The practical embodiment of said elements in a camera is shown in Fig. V. 6 is an enclosing box. The film 1 is fed from and onto spools 7 and is passed through the gate 8 by the drive mechanism 9. The fixed lens 3 is positioned in front of the gate. The series of lenses 2 is constructed as an endless chain 10 which passes over drums 11 and is driven—together with the mechanism 9—by the crank 12. 13 is the aperture through which the lenses 2 are exposed. In order to limit the extent of the images formed on the film and also to overcome certain disadvantages due to the movement of the lenses 2 and the film, it is preferred to employ the arrangement described in our application No. 64,326 filed Nov. 30, 1915 filed herewith. This consists of an optical system 14 which forms a plane image of the object on a translucent screen 15 or on the plane of said screen if the latter is omitted. Said image is then photographed by the lenses 2.

One image 18 only may be formed and photographed at a time, in which case they will be of the ordinary kinematographic type in which there is incontinuity of the action between successive pictures; but it is preferred to project several images onto the film at the same instant by using a series of lenses 2 and making the field of view wide enough to cause more than one of them to be in operation simultaneously, as shown in Figs. III and IV. Each picture is thus exposed for a period which coincides with a portion of the period of the succeeding and preceding pictures and each picture re-produces in some degree the succeeding and preceding pictures. Since the illumination produced by each lens increases and decreases as the lens is respectively entering and leaving the field of view, its corresponding picture (Fig. VIII) exhibits a given moving object $x$ in maximum definition $y$ in a position contemporaneous with the full illumination of that particular picture and also in lessened definition in a range of position $z$ part of which is identical with that of contiguous pictures. Briefly stated, the actions of successive pictures overlap. Said pictures being then projected as dissolving views give an impression of continuous movement which may be made to approximate very closely to the impression produced on an observer by the actual moving object.

The arrangement of the projector (Fig. VI) is generally similar to the camera, with the box 6 omitted and the addition of a source of light 16 and condensers 17. The projector is shown as provided with a removable optical system 14 which re-projects, onto the viewing screen, the image made by the lenses 2 on the translucent screen 15 or the plane where said screen is shown.

The gate 8, lens 3 and chain of lenses 2 are made relatively adjustable toward and from each other by making two of them, e. g. the gate 8 and the lens 3, movable by mounting either or both of them on a member which is adjustable along the frame of the machine by means of a rackbar and pinion mechanism which is operated by the headed member 18 shown in Fig. VI, so that the projection may be made directly into the viewing screen.

We claim:

1. The combination of means for positioning a film, in a plane, a large stationary convergent lens positioned in front of the film plane with its axis at right angles to said plane, a group of smaller lenses positioned in a plane parallel with the film plane and in front of the large lens and with their axes at right angles to the film plane, said large lens and the group of lenses being so adjusted in regard to their distances perpendicular to the film plane as to be capable of producing in the film plane a group of images of an object in front of the system, one image for each small lens, which images are spaced from one another equally with their corresponding small lenses, and the film positioning means exposing a film area greater than that of a single image.

2. The combination of means for positioning a film in a plane, and moving it in said plane, a large stationary convergent lens positioned in front of the film plane with its axis at right angles to said plane, a group of smaller lenses movable with the film parallel with the film plane and in front of the large lens, said large lens and the group of lenses being so adjusted in regard to their distances perpendicular to the film plane as to be capable of producing in the film plane a group of images of an object in front of the system, one image for each small lens, which images are spaced from one another equally with their corresponding small lenses, and the film positioning means exposing a film area greater than that of a single image.

In testimony whereof we affix our signatures.

C. W. R. CAMPBELL.
FRANK G. A. ROBERTS.